T. ROBINS.
BELT FOR CONVEYERS.
APPLICATION FILED APR. 22, 1908.

913,917.

Patented Mar. 2, 1909.

Witnesses
E. P. La Goy
E. Van Zandt

Thomas Robins Inventor
By his Attorneys
Benney & Ogden

UNITED STATES PATENT OFFICE.

THOMAS ROBINS, OF NEW YORK, N. Y.

BELT FOR CONVEYERS.

No. 913,917.  Specification of Letters Patent.  Patented March 2, 1909.

Application filed April 22, 1908. Serial No. 428,687.

*To all whom it may concern:*

Be it known that I, THOMAS ROBINS, a resident of the city of New York, in the State of New York, have invented certain new and useful Improvements in Belts for Conveyers, of which the following is a specification, accompanied by drawings.

It has been customary to make conveyer belts of several layers of strong canvas and vulcanized rubber with a relatively thick wearing surface upon the face of the belt that is subject to the wear of the ore, coal, or other bodies carried. I have observed that in the use of such belts the cover is sometimes cut or cracked through to the first layer of the canvas and that small pieces of the stone or other material carried, or of dirt, accumulate in the hole thus formed and gradually work in between the rubber cover and the canvas, causing what are known as blisters, which sooner or later become torn off, leaving the canvas bare in patches. Belts which carry heavy pieces of sharp material are particularly apt to become injured in this way. Where such rubber belts are used for conveying hot materials also the rubber cover tends to become hardened and crack, these cracks frequently reaching the canvas and allowing the dirt or other materials to work into the belt in a similar way to that already mentioned.

The present improvement seeks to produce a belt that shall be less subject to deterioration from such causes as those mentioned and shall have a wearing face of increased durability and which shall adhere to the canvas body of the belt. It will, however, be understood that some parts of the invention may be used without others.

In the accompanying drawings the invention is shown as I prefer to employ it, and from a description of these drawings the nature of the invention in its preferred details will be readily understood.

Figure 1:
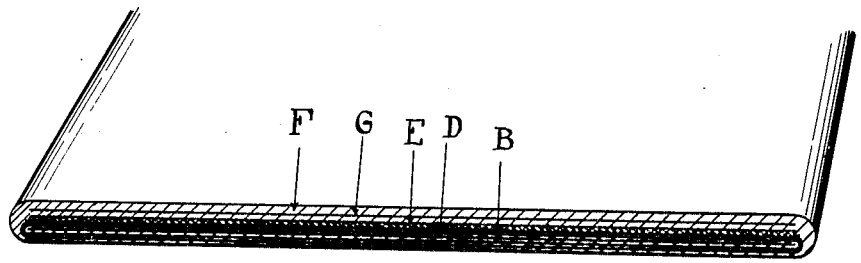
Figure 2:
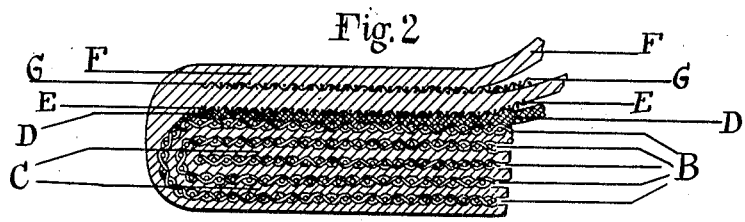
Figure 3:
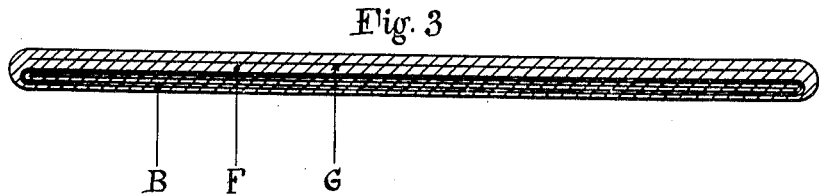

In the drawings, Figure 1 is a reduced cross sectional view of a piece of belting embodying the invention. Fig. 2 is a detail view of a portion of Fig. 1 showing the various plies of the belt partly torn apart for illustrative purposes. Fig. 3 is a cross section of a modification omitting some of the features of Figs. 1 and 2.

At B are shown several thicknesses of strong canvas between which are interposed thin layers of rubber composition C, as usual in this class of belts.

At F is shown the cover or wearing face of the belt, which is preferably several times as thick upon the wearing face of the belt as upon the lower or rear face of the belt, which only comes in contact with the pulleys and does not carry the load. The wearing face or cover F is secured to the uppermost layer of canvas by first coating the upper ply of canvas with a thin layer D of very good rubber of relatively high adhesive quality as compared with the rubber composition used for the rest of the belt. Upon this is laid a layer E of very openly woven cloth, such as cider-press cloth or cheese cloth, and on top of this comes the usual rubber composition of the belt cover or wearing face F. The adhesive layer D, when the belt is vulcanized under pressure, readily comes in intimate contact with the cheaper rubber of the cover through the openings in the openwork fabric E, and this gives the cover a much better grip than it would otherwise obtain directly upon the canvas forming the body of the belt and which is necessarily of a closely woven nature. The adhesive layer D of higher grade rubber sticks very strongly to the canvas of the belt and forms a bond between the belt and the regular cover F. I furthermore embody at about the mid-thickness of the wearing layer or cover F of the belt a layer G of loosely woven openwork cloth or fabric such as cider-press cloth, scrim, or mosquito netting, it being laid in between two layers of the cover, as indicated at the right-hand end of Fig. 2 before the belt is finally vulcanized under pressure. This layer is sufficiently openwork for the rubber composition to readily penetrate it and constitute substantially a single mass of covering material of the belt in which the openwork layer G is embedded.

With this improved construction I find that the cracks produced by the hardening of the rubber when conveying hot materials or by the cutting or punching of the rubber by sharp materials do not cause the same damage to the belt and largely prevent foreign bodies working along between the rubber cover and the canvas in the way mentioned and largely prevent the formation of bare patches.

In Fig. 3 a cross section of belt is shown in which the adhesive layer D and openwork fabric E are omitted and the openwork binding layer G is present. So also the binding layer G might be omitted and the adhesive layer D and openwork fabric E employed.

It will be seen that the canvas and rubber strengthening portion of the belt may be designated a backing or body and the wearing layer of the belt a cover, and that the binding layer G is within the cover while the layers D and E form intermediate layers firmly uniting the cover to the backing or body of the belt. By "rubber" I mean also to include substitute or equivalent compositions acting in the same way in the finished belt.

What I claim and desire to secure by Letters Patent is the following:

1. A belt for conveyers having in addition to a layer or series of layers of relatively strong close fabric and rubber composition constituting a backing or body, a wearing face or cover of resilient composition containing within it a binding layer of openwork fabric through which the material of the cover penetrates and having between the backing or body and the wearing face an adhesive layer of relatively high adhesive quality and an openwork fabric through which the said adhesive layer penetrates and unites the cover and backing, for substantially the purposes set forth.

2. A belt for conveyers having a relatively strong backing or body and a cover of rubber composition containing within it a binding layer of openwork fabric, an openwork fabric between the cover and body, and an adhesive layer penetrating the last said fabric and uniting the cover and body, for substantially the purposes set forth.

3. A belt for conveyers having a body portion of relatively strong fabric and rubber and a wearing layer or cover having between the wearing face and the body of the belt a binding layer of openwork fabric through which the material of the wearing face penetrates, for substantially the purposes set forth.

4. A belt for conveyers having a relatively strong and stiff backing or body and a relatively resilient wearing layer or cover and having embedded within the wearing layer or cover an openwork binding fabric G, for substantially the purposes set forth.

5. A belt having a backing or body of one or more layers of rubber composition and strong fabric, a relatively resilient wearing layer or cover and an intermediate adhesive layer of relatively high adhesive quality, and an openwork fabric through which the said adhesive layer penetrates, for substantially the purposes set forth.

In testimony whereof I have signed this specification in the presence of two subscribing witnesses, April 21, 1908.

THOMAS ROBINS.

Witnesses:
A. E. LUDINGTON,
A. M. GILLIGAN.